US011120370B2

(12) United States Patent
Ornstein et al.

(10) Patent No.: US 11,120,370 B2
(45) Date of Patent: Sep. 14, 2021

(54) PARKING MANAGEMENT SYSTEM

(71) Applicant: BlitzIt, Inc., Phoenix, AZ (US)

(72) Inventors: Jonathan Ornstein, Phoenix, AZ (US); Jessica Ornstein, Phoenix, AZ (US); Nishit Rathod, Phoenix, AZ (US)

(73) Assignee: BLITZIT, INC., Phoenix, AZ (US)

( * ) Notice: Subject to any disclaimer, the term of this patent is extended or adjusted under 35 U.S.C. 154(b) by 0 days.

(21) Appl. No.: 16/142,113

(22) Filed: Sep. 26, 2018

(65) Prior Publication Data
US 2019/0043083 A1 Feb. 7, 2019

Related U.S. Application Data

(62) Division of application No. 16/053,878, filed on Aug. 3, 2018.

(60) Provisional application No. 62/540,649, filed on Aug. 3, 2017.

(51) Int. Cl.
G06Q 10/02 (2012.01)
G06Q 30/02 (2012.01)
G06Q 10/04 (2012.01)

(52) U.S. Cl.
CPC ............. *G06Q 10/02* (2013.01); *G06Q 10/04* (2013.01); *G06Q 30/0223* (2013.01); *G06Q 30/0251* (2013.01); *G06Q 30/0284* (2013.01); *G06Q 2240/00* (2013.01)

(58) Field of Classification Search
CPC . G06Q 10/02; G06Q 30/0251; G06Q 2240/00
USPC .......................................................... 705/13
See application file for complete search history.

(56) References Cited

U.S. PATENT DOCUMENTS

| 6,750,786 | B1 | 6/2004 | Racunas |
| 7,893,847 | B2 | 2/2011 | Shanbhag |
| 2005/0280555 | A1 | 12/2005 | Warner |

(Continued)

FOREIGN PATENT DOCUMENTS

WO    WO2016127215    8/2016

OTHER PUBLICATIONS

Jeffrey et al., "Smart Parking System using Wireless Sensor Networks", SENSORCOMM 2012 : The Sixth International Conference on Sensor Technologies and Applications, 306, 311 (Year: 2012).*

(Continued)

Primary Examiner — Emmett K. Walsh
(74) Attorney, Agent, or Firm — McDonald Hopkins LLC

(57) ABSTRACT

Disclosed is a parking management system that includes a central database in communication with a server, at least one user device, at least one merchant console, and a parking gate controller device over a network. The central database is provided to receive and store data from a plurality of parking systems. A processor is provided for analyzing the data received by the central database. A dynamic data engine is provided for analyzing the data from the plurality of parking systems and generating dynamic pricing data. A targeted promotion engine is provided for analyzing user data and generating a targeted promotion. The dynamic pricing data may be provided to the user device to allow a user to book a parking space from one of the parking systems. The targeted promotion may be provided to the user device to allow the user to select a promotion offered from a merchant.

8 Claims, 17 Drawing Sheets

(56) References Cited

U.S. PATENT DOCUMENTS

| | | | |
|---|---|---|---|
| 2013/0024211 A1* | 1/2013 | Monteforte | G06Q 30/0268 705/3 |
| 2014/0100894 A1 | 4/2014 | Ariemma | |
| 2014/0122375 A1* | 5/2014 | Li | G07B 15/02 705/418 |
| 2016/0171891 A1* | 6/2016 | Banatwala | G07B 15/02 340/932.2 |
| 2016/0217457 A1* | 7/2016 | Berman | G06Q 10/02 |
| 2016/0292808 A1 | 10/2016 | Blandin | |
| 2017/0098374 A1* | 4/2017 | Sullivan | H04W 4/44 |
| 2017/0323227 A1* | 11/2017 | Sadeghi | G07F 17/246 |
| 2018/0096263 A1* | 4/2018 | Modi | G07B 15/00 |
| 2018/0268617 A1* | 9/2018 | Bruce | G07B 15/02 |

OTHER PUBLICATIONS

International Searching Authority, European Patent Office, International Search Report and Written Opinion for International App. No. PCT/US2018/045078 dated Dec. 11, 2018.

* cited by examiner

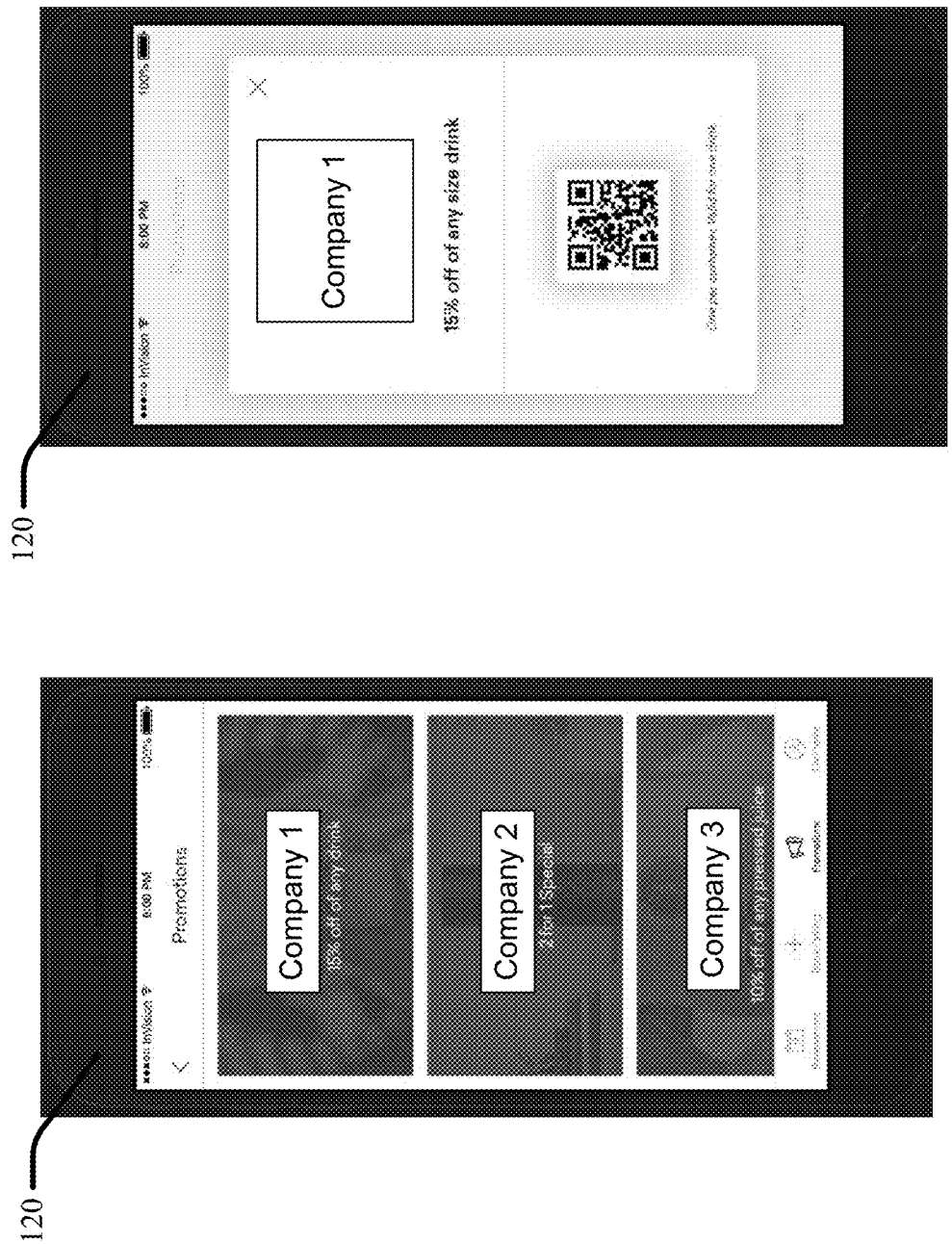

PARKING MANAGEMENT SYSTEM

CROSS-REFERENCE TO RELATED APPLICATIONS

This application claims the benefit of and is a divisional of U.S. patent application Ser. No. 16/053,878 entitled "PARKING MANAGEMENT SYSTEM," filed on Aug. 3, 2018, which claims the benefit of U.S. Provisional Patent Application No. 62/540,649, entitled "PARKING MANAGEMENT SYSTEM," filed on Aug. 3, 2017, which is hereby incorporated by reference.

FIELD OF THE INVENTION

The present invention is generally related to a system and method for efficiently managing parking systems. More particularly, this disclosure is related to a parking management system for dynamically tracking and determining parking data for a variety of parking systems.

BACKGROUND

The parking systems such as garages and lots are generally subject to passive management. Various techniques have been developed to reduce operating cost and to increase revenue and utilization. These available techniques utilize parking management systems that include a combination of software and hardware implemented by a program over a network. These systems are disclosed by various published patent documents such as, for example, U.S. Patent Publication 2017/0098374 to Sullivan et al which teaches a parking data aggregation and distribution system. However, these types of systems are disclosed for tracking parking related data, such as yield and amount a parking system charges its customers.

Yield management systems have been implemented to enhance utilization in various industries with similar dynamics to parking systems such as with airlines, hotels, and rental cars. Whether airline "seats" or parking "spots", yield management systems attempt to generate additional revenue and maximize utilization. However, existing yield management systems for parking facilities may not generate efficient utilization rates due to varying demand and other conditions that are specific to parking systems. These parking systems generally rely on limited data to manage utilization of their facilities.

Thus, there may be a need to provide an improved yield management system for parking systems to increase utilization and improve revenue generation. There may also be a need to allow users to customize a parking management system to individually determine their goals for operating a parking system

SUMMARY

Disclosed is a parking management system that includes a central database in communication with a server, at least one user device, at least one merchant console, and a parking gate controller device over a network. The central database is provided to receive and store data from a plurality of parking systems. A processor is provided for analyzing the data received by the central database. A dynamic data engine is provided for analyzing the data from the plurality of parking systems and generating dynamic pricing data. A targeted promotion engine is provided for analyzing user data and generating a targeted promotion. The dynamic pricing data may be provided to the user device to allow a user to book a parking space from one of the parking systems. The targeted promotion may be provided to the user device to allow the user to select a promotion offered from a merchant.

The dynamic data engine may generate the dynamic pricing data which includes a plurality of prices for reserving parking spaces at a plurality of parking systems. The dynamic data engine may process date, time, price, utilization, weather, competitive data, foot traffic, number of guests, and scheduled events to generate the dynamic pricing data. The dynamic data engine may generate a forecasted price for a parking space based on an input of date and time as desired by the user. The dynamic data engine may be programmed to generate various price granularities for a plurality of parking systems. The data from the plurality of parking systems includes usage date, usage time, parking price, utilization rate, weather information, competitive pricing, and foot traffic.

The targeted promotion engine may generate and send targeted promotions to the user. The targeted promotions include offers, messages, or notifications based on the input preferences set up by the merchants Also described is a parking management system comprising a central database in operative communication with at least one user device, and at least one merchant console of at least one parking systems, wherein the central database operatively receives and stores data from the at least one merchant counsel. The central database may comprise a processor and a memory storing instructions that, when executed by the processors, cause the processors to execute computer executable engines stored in the memory. The engines may comprise a dynamic data engine that operatively analyzes the data from the at least one parking systems and generates dynamic pricing data for the at least one parking systems, and a targeted promotion engine that operatively generates a targeted promotion based on the user data, wherein the targeted promotion is to be sent to the at least one user device. The dynamic pricing data includes a plurality of prices for reserving parking spaces at the at least one parking systems. In another aspect, the dynamic data engine generates the dynamic pricing data based on at least one of a date, time, price, utilization, weather, competitive data, foot traffic, number of guests, and scheduled events. It is noted that said dynamic data engine may generate a forecasted price for a parking space based on an input of date and time. Moreover, the dynamic data engine may execute a staging phase to generate a baseline for price sensitivity as a function of historic price change data associated with the at least one parking systems. The dynamic data engine may receive a price increase granularity for the at least one parking systems and generate the dynamic pricing data as a function of the price increase granularity. The data from the at least one parking systems stored in the central database includes at least one of usage date, usage time, parking price, utilization rate, weather information, competitive pricing, and foot traffic. In examples, the dynamic data engine operatively generates the dynamic pricing data based on a predefined interval of time, and in other examples, the dynamic data engine operatively generates the dynamic pricing data in time real time. The targeted promotions may include offers, messages, or notifications based on the input preferences set up by the merchants. The targeted promotion engine generates and sends the target promotions based on information associated with the user device. The information associated with the user device includes an indication of a user entering or exiting a parking system. The dynamic pricing data includes a plurality of prices for parking spaces at the at least one parking systems for use by a user in an unreserved scenario. The targeting promotion engine captures feedback data from one or more user devices and determines a user affinity for the targeted promotion and provide the feedback information to the database.

Another example includes a parking management system comprising one or more parking system devices each associated with a parking system, one or more processors in communication with the one or more parking system devices and one or more memory resources storing instructions that, when executed by the one or more processors, cause the one or more processors to, receive and store pricing and utilization data from one or more parking system devices in a database, generating a pricing and utilization model for the one or more parking systems based on the received pricing and utilization data, creating a list of price-utilization options based on the pricing and utilization model for selection by a user, and receiving a selection of a price-utilization option from the list. The processor further receives optimization criteria and generates one or more optimization options for the list of price-utilization options. The optimization criteria include at least one of revenue optimization or utilization optimization. The one or more parking system devices include an input device that receives information from a user device as a user enters or exits the parking system. The information from the user device comprises a scannable image.

Described is a method for a parking management system, comprising generating a baseline sensitivity for a parking system based on a history of price changes and utilization associated with the price changes, creating a model for price and utilization of the parking system based on the baseline sensitivity, receiving information associated with at least one of foot traffic, events, weather information, or user preferences, and utilizing the model and the received information to determine dynamic price adjustments for a predefined time interval. The method may further comprise receiving flight information describing at least one of a number of flights or number of passengers, and wherein utilizing the model further comprises utilizing the flight information and the received information to determine the dynamic price adjustments

BRIEF DESCRIPTION OF THE DRAWINGS

The disclosed method and system may be better understood by reference to the following detailed description taken in connection with the following illustrations, wherein:

FIGS. 9-24 illustrate images displayed on a graphical user interface of a user device of the present disclosure.

DETAILED DESCRIPTION

Figure 1:
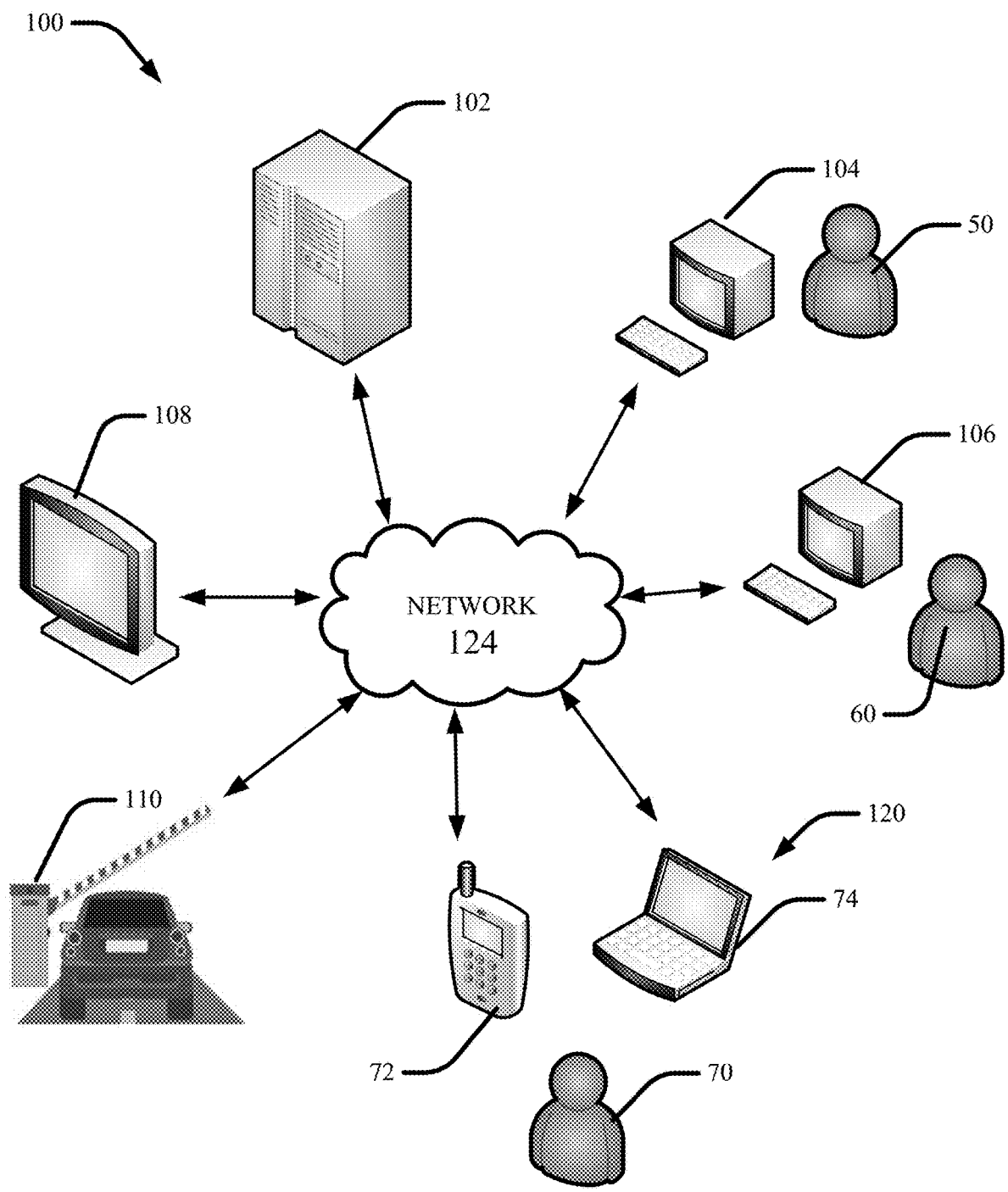
FIG. 1 is a conceptual overview of a parking management system for managing the operation of a parking system in accordance with the present disclosure.

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

The present disclosure provides a parking management system 100 that may collect, analyze, and generate predictive information to assist with managing a parking system. The parking management system 100 may collect and analyze various parking data such as occupancy and turn-over data related to utilization of parking spaces from a particular parking system. The system may also collect data from various other sources and generate predictive information related to the management of the parking facility or system. The collected data and generated prediction information may be processed and provided to computing devices utilized by any of parking operators, consumers, and merchants. The term "parking system" may be used herein to describe a physical building, garage, or facility containing many parking spaces, but may also refer to a flat parking lot, a group of metered parking spaces on a street, underground lot, or any group of parking spaces managed by a parking operator or the ownership.

Embodiments described herein may generate prediction or forecasting models for dynamic management of parking systems. The models may be a function of user defined parameters or predefined parameters. The parameters may include date/time, price, utilization of available parking spots, weather information (e.g., average temperature, minimum/maximum temperature, precipitation, etc.), competitive pricing information, foot traffic (e.g., number of guests, number of flights or passengers, number of tickets sold to an event, etc.), events (e.g., performances, sports events, promotions at a mall, holidays, etc.), customer history, customer preferences, or the like. It is noted that embodiments may include a staging process or phase wherein historical information of price changes are analyzed to establish a baseline of price sensitivity. The historical information may additionally be utilized for model generation. In some examples, an operator may not have a history of price changes as there may have been a flat rate. As such, the prices may be systematically adjusted and described systems may establish a baseline for price sensitivity utilizing information gathered during the adjustments.

Moreover, described embodiments may include a dynamic data or pricing engine. The dynamic data engine may determine pricing changes for a particular parking system. It is noted that different parking systems may comprise different preferences in terms of granularity (e.g., an airport may decide to adjust prices on a weekly or monthly basis, whereas a mall may prefer price changes on a daily basis or at peak times). In some embodiments, the dynamic data engine may receive input or user preferences regarding the granularity, acceptable price ranges (e.g., upper threshold, lower threshold, unit step (e.g., increase or decrease by x units, where x is a number and units is a unit of currency), optimization criteria (e.g., revenue, utilization, etc.), or the like. Described dynamic data engines may utilize these and other inputs to generate models. The models may be updated via a feedback loop in real-time, daily, or another time period based on historical information (e.g., actual weather, actual utilization, actual revenue, etc.). The models may predict utilization, revenue, or other metrics for a particular date, time, and price based on parameters such as weather forecasts, events, foot traffic, or other parameters described herein. The models may select or provide an operator with options for selection of a price level for a desired amount of revenue or utilization. In some embodiments, the models may select a price level based on optimization criteria selected by a user.

In instances prices are updated at predefined intervals and an operator approval of price changes may be required. In such described systems, models may be updated using collected data from a timer interval that has ended (e.g., past day, etc.). A price-utilization list or options may then be generated as described herein. This price-utilization list, and other additional or optional information, may be presented to an operator and the operator may select a price level for the next interval of time. In some embodiments, a system may allow for reservations to be made in advance by drivers. These reservations may be utilized in generation of the price-utilization list for future time intervals.

Some embodiments may utilize targeted campaigns, as described here as well as elsewhere in the specification. In these campaigns, described systems may generate notifications (e.g., promotional offers, messages, surveys, or the like) to drivers who are entering or exiting a parking system, are near a parking system, have recently entered or exited a parking system, or the like. The notifications may be based on campaigns set up by an entity (e.g., retail store, gas station, etc.) located at or near the parking system. However, entities may utilize campaigns regardless of their location. It is noted that notifications may be generated via campaigns set by businesses or third parties (e.g., retail stores near a parking garage), customer information (e.g., demographic information, flight information, user preferences, user feedback, etc.), time/day, events, or the like.

In at least one example, a driver may enter into a parking lot and may utilize a user device to enter through a gate or notify the system of their arrival. The system may record a time of entry and may generate notifications to be sent to the user at i minutes after entry, where i is a number. In some instances, a user may not utilize a user device when entering a parking system. As such, the user device's GPS, Wi-Fi connectivity status, or other location information may alert the systems that the user has entered the garage and a notification may be generated. In another aspect, the user may receive a notification when within a specified range of a business. The user's location may be determined based on GPS information, Wi-Fi connectivity, beacons sending proximity, or the like.

FIG. 1 illustrates a conceptual overview of an embodiment of the parking management system 100. The system 100 may include a management server 102, a parking system operator console 104, a merchant console 106, signage 108, a parking gate control device 110, and a user device 120. The user device 120 may be a cell phone 72, lap top 74, tablet, deck top, or other device that may access the network. Each of these devices may communicate through a network 124 wherein the network 124 may include the internet, cloud, Wi-Fi, radio transmission, or other medium as is generally known in the art. Additionally, the architecture of the system 100 allows each of the devices to communicate with one another such that information can be communicated and stored via the server 102 or other peripheral device. These devices of the parking management system 100 track user data, generate dynamic pricing data, and generate targeted promotions as to be described more fully below.

A plurality of parking garage users 70 may access a user facing portion of the parking management system through the user device 120. FIGS. 9-24 illustrate dashboard views of the user device application. A merchant 60 may operate the merchant console 106. FIGS. 25-29 illustrate dashboard views of the merchant console application. A parking garage operator 50 may operate the parking garage operator console 104 and may be associated with one or more parking systems. The parking management system 100 may be implemented over the server 102 or any one of the consoles 104, 106 and user device 120 to allow the operator 50, merchant 60 and users 70 to access particular applications of the system. The operator 50 may access both the merchant console application and the user device application while the merchant may access the merchant console application and the user may access the user device application. The merchant console application may display different information and include different functionality than the user device application. Further, the system 100 may display information on signage 108 via the network 124.

Such networks 124 may include wired and wireless networks, including, but not limited to, a cellular network, a wide area network (WAN) or a local area network (LAN). For example, the one or more user device 120 may communicate with the server 102 using virtually any desired wired or wireless technology, including but not limited to: wireless fidelity (Wi-Fi), global system for mobile communications (GSM), third generation partnership project (3GPP) long term evolution (LTE), Zigbee, 802.XX wireless technologies, legacy telecommunication technologies, BLUETOOTH®, and ultra-wideband (UWB) standard protocol technologies.

Aspects of the parking management system 100 may be implemented by machine-executable components embodied within a computer system in which a set of instructions can cause to execute a device to perform any one or more aspects of the present disclosure. The components described are examples only and do not limit the scope of use or functionality of any hardware, software, embedded logic component, or a combination of these components. As illustrated by FIG. 1, each of the described consoles or devices may include a processor, a memory, and a storage that communicate with each other, and with other components. These consoles or devices may also link a display, input devices, output devices, storage devices and may interface various other components as is known in the art. Each computer or component device may have any suitable physical form, including but not limited to one or more integrated circuits, printed circuit boards, laptop or notebook computers, distributed computer systems, or mobile handheld devices. Processors may contain a cache memory unit for temporary storage of instructions, computer addresses, or data. Processors may be configured to assist in execution of computer readable instructions. The processors may execute non-transitory, processor-executable instructions embodied in one or more tangible computer-readable media such as storage devices or memory medium.

Figure 2:
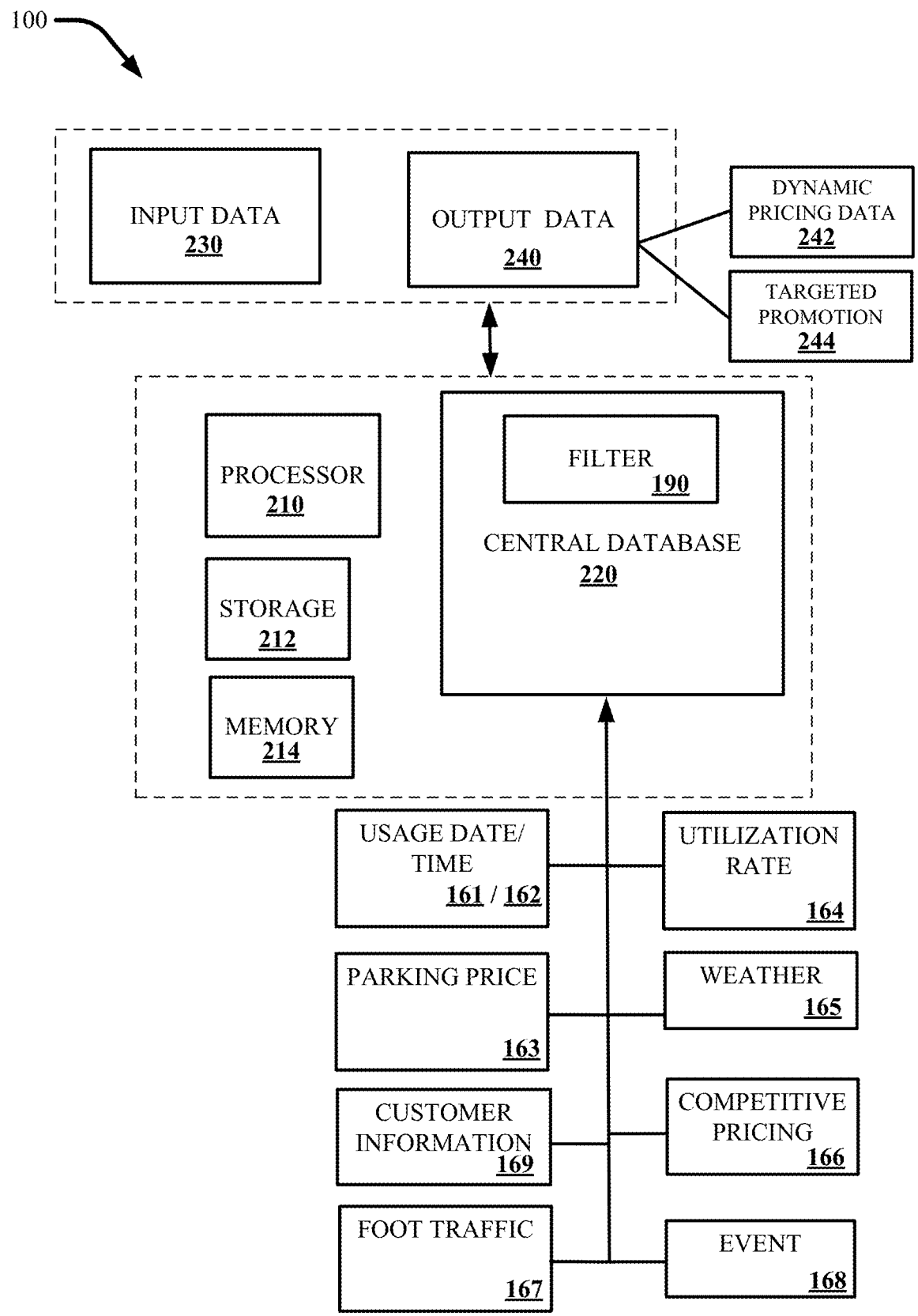
FIG. 2 illustrates a block diagram of an embodiment of the parking management system in accordance with the present disclosure.

The architecture of the system 100 may be implemented through any of the devices identified in FIG. 1 but, in one embodiment, may be located on the server 102. Referring to FIG. 2, the parking management system 102 may include a processor 210 in communication with storage 212, memory 214 and a central database 220. The central database 220 may receive and store a variety of data as it relates to the parking systems. For example, the central database 220 may include data such as the usage date 161, usage time 162, parking price 163, utilization rate 164, weather information 165 (e.g., precipitation metrics, temperature metrics, weather forecasts, etc.), competitive pricing 166, foot traffic 167, and customer information 169 (e.g., customer preferences, customer history, etc.). It is noted that the central database may include other information that may be utilized to, for example, determine dynamic pricing or promotions. For instance, the data may include a number of flights/passengers at an airport/terminal, the number of guests at events, holiday schedules, GPS information from user devices, traffic information, construction information, or customized data fields based on a specific region or entities. Events may include sporting events, concerts, gatherings, or promotions at shopping facilities. Further, the database 220 may include a filter 190 that allows the database to be programmed to sift through various ranges of data that may be collected by the system 100. Each device may be configured to provide input data 230 that may be communicated to the processor 210 and central database 220. Additionally, each device is configured to receive output data 240 from the central database 220 and the processor 210. The output data 240 may include a dynamic pricing data 242 and a targeted promotion data 244 as will be described more fully herein.

Figure 3:
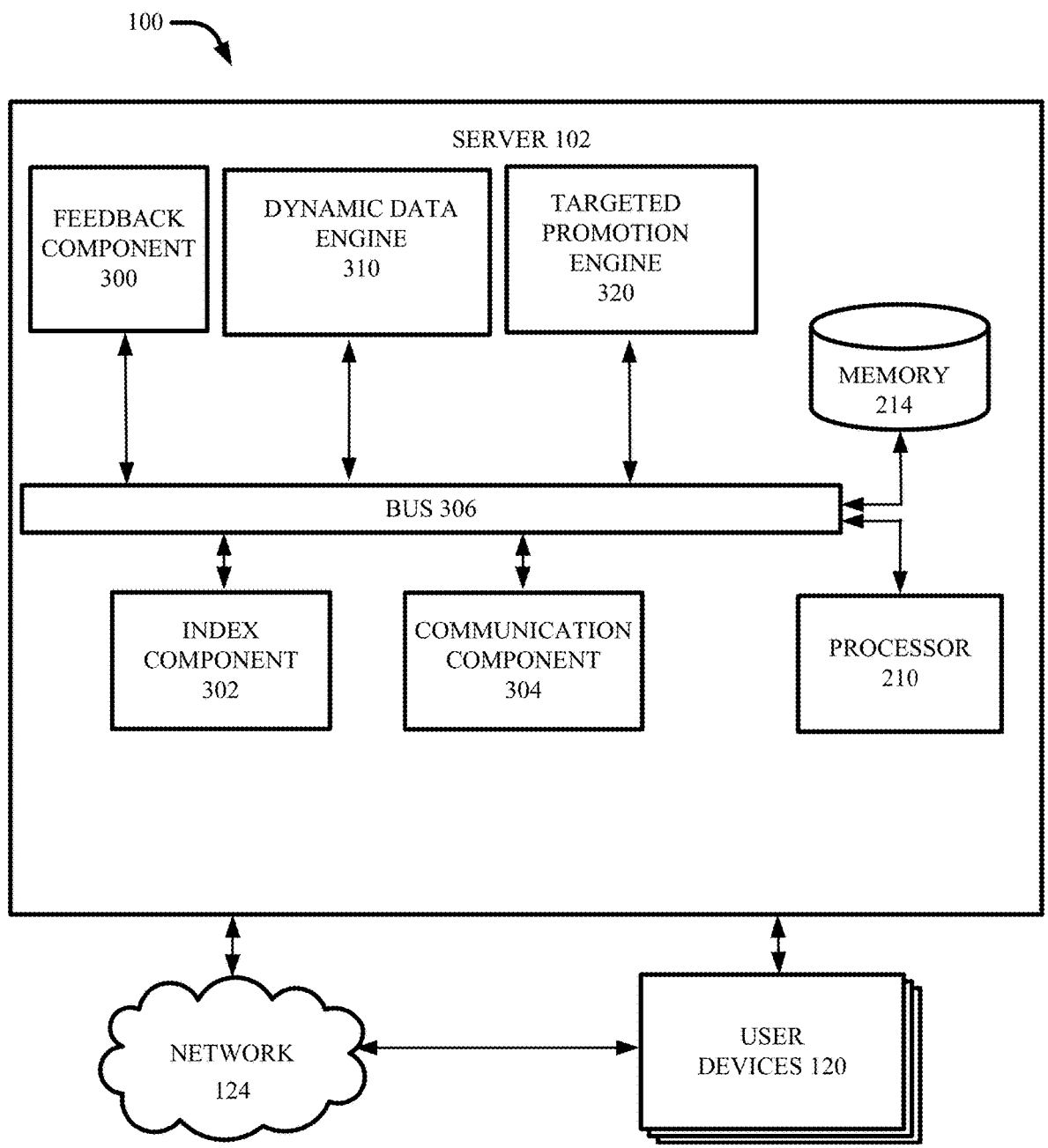
FIG. 3 is a diagram of an embodiment of the parking management system in accordance with the present disclosure.

Referring to FIG. 3, the parking management system 100 may be stored and implemented through the server 102, network 124 and one or more user devices 120. The server 102 may include various computer-executable components, including, but not limited to, a feedback component 300, dynamic data engine 310, targeted promotion engine 320, and a communication component 304. The server 102 may also include or otherwise be associated with at least one memory 214 that stores computer-executable components. The processor 210 may execute computer-executable commands stored in the memory 214. A system bus 306 may couple the various components including, but not limited to, the feedback component 300, the dynamic data engine 310, the communication component 304, the memory 330 and the processor 220.

The communication component 304 may facilitate wireless communication between the server 102 and the one or more user devices 120, or between the server 102 and one or more other external devices (not shown). For example, the communication component 304 may receive feedback information from one or more user devices 120 or one or more other devices (e.g., a gate control device 110 or other sensors or information sources associated with the user, etc.) and forward the feedback information to the feedback component 300 for processing.

The communication component 304 may include hardware (e.g., a central processing unit (CPU), a transceiver, a decoder), software (e.g., a set of threads, a set of processes, software in execution) or a combination of hardware and software that facilitates communicating information between the server 102 and the one or more user devices 120. Further, although the embodiment of the feedback component 300, the dynamic data engine 310, the targeted promotion engine 320, and the communication component 304 are provided at the server 102, it should be appreciated that the architecture of parking management system 100 is not so limited. For example, one or more of the components included at the server 102 may be located at another device, such as another server device, an intermediary device between the server device and the one or more user devices 120, or at the one or more consoles, etc.

Figure 4:
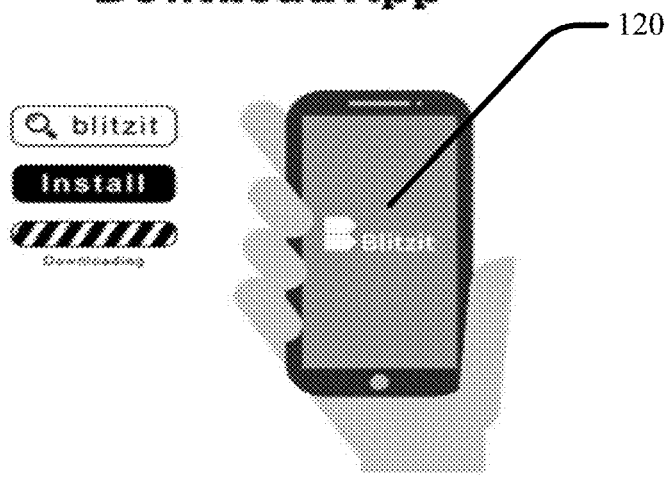
FIGS. 4 and 5 illustrate a mobile device displaying a portion of the parking management system thereon.
Figure 5:
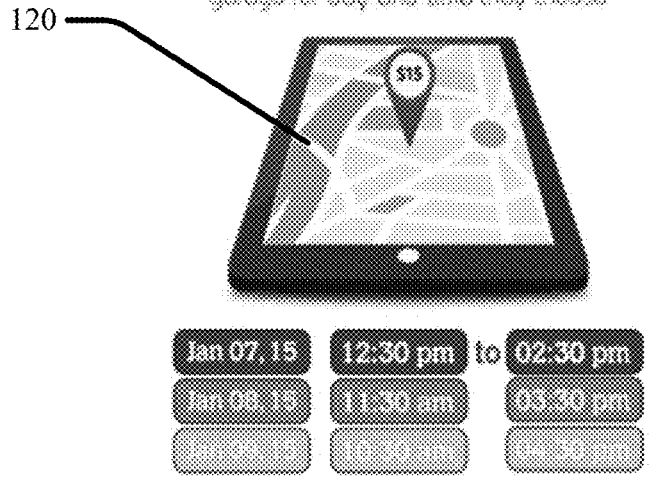
Figure 6:
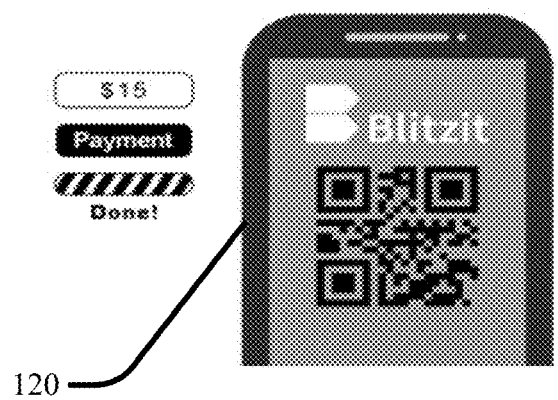
FIG. 6 illustrates a mobile device displaying a QR code in accordance with one aspect of the present disclosure.

FIGS. 4 through 6 illustrate a mobile device 72 displaying a portion of the parking management system thereon. The mobile device 72 may display the user application to allow a user 70 to reserve and purchase a parking space from a variety of parking systems as illustrated by FIGS. 4, 5 and 9-18. However, before a user books a parking space, the parking management system 100 may provide a user various options based on generating and presenting dynamic pricing data 242 and targeted promotion 244 by collecting and processing data from a plurality of sources.

The dynamic data engine 310 generates the dynamic pricing data 242 which may include a price presented to the user device 120 for reserving the parking space. Here, the dynamic data engine 310 may process different types and amounts of data available based on prediction or forecasting models. The dynamic pricing data 242 may be based on predicted utilization rates at various price levels that allow the operator of the parking system to meet optimal revenue versus utilization rates. The parameters that may be considered by the dynamic data engine 310 includes: date, time of day, price, utilization, weather, competitive data, foot traffic, number of guests, and scheduled events. Weather data may be provided by an available third party weather service. Scheduled event data may be provided by various known or published calendars or schedulers. This data may be analyzed to create a forecasted price for a parking space based on an input of date and time as desired by the user. The user may also be prompted to set up a user account and to log into the application. The user may provide input data 230 representative of a desired date, time, and location to search for a parking space at a desired location of which multiple parking systems may be able to provide parking spaces for reservation. The system may be utilized to reserve a parking space from a parking system at a future time or may be used during unreserved scenarios. For example, a user may drive up to a gate at a parking system and be granted access through pre-issued credentials, or pull a ticket from the gate, or scan indicia at the gate through the parking management system 100. In various embodiments, the user may then be permitted to enter the gate and park. It is noted that the user device may store information associated with where the user parks, such as an address, garage name, parking spot number, parking garage level, or the like. This information may be entered by a user manual, or a user may scan a code or other indicia at a particular parking spot.

According to other embodiments, the user may receive a code to enter into a gate or point of sale. The code may be periodically updated or uniquely generated for a particular transaction. For example, some gates may comprise an interface such as key pads or touch screens. The user may receive a code and may enter the code via the interface. In other examples, the user may utilize the user device 120 to enter the code or click an activation button. The user devices may transmit this information to a gate directly or via a server that is in communication with the gate. Moreover, other embodiments may utilize radio frequency identification (RFID) devices, BLUETOOTH, Beacon devices, such as Near Field Communication (NFC) devices. Some embodiments may utilize a radio access network (RAN), e.g., Wi-Fi, Wi-Fi Direct, global system for mobile communications, universal mobile telecommunications systems, worldwide interoperability for microwave access, enhanced general packet radio service, third generation partnership project long term evolution (3G LTE), fourth generation long term evolution (4G LTE), third generation partnership project 2, ultra mobile broadband, high speed packet access, $x^{th}$ generation long term evolution, or another IEEE 802.XX technology. Furthermore, embodiments may utilize wired communications. In an example, an NFC device may comprise stored information, such as in a memory (e.g., read-only memory (ROM), random access memory (RAM), electrically erasable programmable read-only memory (EEPROM), or various other types of memory). In an example, an NFC component may include an NFC tag and an NFC emitter. The NFC tag and NFC emitter may each include one or more antennae that may communicate with a reader of a gate or garage. In one example, the user device 120 may utilize an NFC device to generate a code or signal that is received by the gate's reader. The gate verifies that the code is valid and may allow the user to pass through the gate. Moreover, it is further noted that stand-alone devices may comprise an NFC component that may communicate with the gate. For instance, an NFC device may comprise a plastic housing that houses an NFC antenna and NFC chip. The stand-alone NFC device may operatively communicate with the user device 120 to receive a code and may relay this code to a reader at a gate.

In a staging phase, the dynamic data engine 310 may analyze historic data specific to the parking system regarding whether rates have been flat or have changed and specifically if an operator of a particular parking system has established a baseline for price sensitivity.

In one embodiment, the dynamic data engine 310 may be programmed to generate various price granularities. For example, price granularity may include a generated price for a specific parking system, such as an airport, that modifies prices on a weekly or monthly basis, whereas another parking system, such as a shopping mall, may decide to modify prices on a daily basis.

In one embodiment, the dynamic data engine 310 may be programmable by the operator of the parking system to account for granularity, range of minimum and maximum price range, unit step increase or decrease, and optimization criteria. The optimization criteria allow an operator or garage owner to specify criteria for setting prices dynamically. As an example, an operator may specify one or more aspects to which price optimization should utilize. In some embodiments, an owner may wish to maximize revenue or maximize utilization. Maximizing revenue may set prices irrespective of how much or how little a parking lot is utilized. Maximizing utilization may set prices to increase utilization, which may require reduce prices and revenue.

It is noted that the operator may choose desired revenue ranges, utilization ranges, or the like, rather than picking to maximize on a particular optimization criteria. The dynamic data engine 310 may generate one or more options to achieve results within the selected ranges, and may present the options to the user. The user may select an option or may allow the dynamic data engine 310 to automatically select an option.

Additionally or alternatively, the operator may select to alter optimization criteria based on dates, times, utilization (e.g., maximize utilization until 80% of spots are full, then switch to maximization of revenue), or the like. For instance, the operator may select to optimize utilization during a particular time or date (e.g., weekends, weekdays, nights, mornings, etc.) and optimize revenue a different time or date. Moreover, the operator may select to override or opt out of dynamic prices for a given time period, may provide early bird special rates, or the like.

The optimization criteria may be different for each operator of each parking system. An operator's preferred optimization criteria may be selected by the operator of the specified parking system. The dynamic data engine 310 may generate a predictive profile that establishes an optimal price at a particular time for a selected parking system to facilitate an acceptable level of parking space utilization, revenue generation, or other optimization metric that may be specified by a user. The historic predictive profile may be recorded. Based on inputs provided by the operator of the parking system, the dynamic data engine may operate in a real-time mode as follows:

a. The dynamic data engine 310 generates a price-utilization list that includes information reflective of a lowest acceptable price to a highest acceptable price based on unit step increments.

b. The dynamic data engine 310 may predict the utilization (amount of parking spaces occupied) based on its analysis of historical data collected and stored in the memory. These predictions may incorporate weather data and event data from third party sources.

c. The utilization prediction for a current price level may be recorded.

d. A price profile is selected by the operator from the price-utilization list that meets the optimization criteria.

e. The dynamic data engine 310 is updated by the feed back component 300 which incorporates real time data to update the price-utilization list and/or the optimization criteria. The real-time mode of the dynamic pricing engine may continually track this information for a parking price for each of the unit step increment amounts set between the lowest acceptable price and the highest acceptable price.

f. A user may order a parking space for a selected date and time in a desired area.

g. The user application may offer dynamic pricing data 242 to the user. The dynamic pricing data 242 generated by the dynamic data engine 310 as selected by the operator from the price-utilization list and as updated by the feedback component 300 for a plurality of parking systems in a desired area.

h. The user may select a parking space from the dynamic pricing data 242 to reserve a parking space.

In another embodiment, the dynamic data engine 310 may operate in a predefined interval mode where parking space prices may be updated at predefined intervals of time or where an operator may approve a generated price change before it is offered by the parking management system 100 to the user device 120. Based on inputs provided by the operator of the parking system, the dynamic data engine may operate in the interval mode as follows:

a. The dynamic data engine 310 processes the data collected and records parking space pricing and utilization data for a specified interval of time.

b. The dynamic data engine 310 generates a price-utilization list that includes information by starting with a lowest acceptable price to a highest acceptable price based on unit step increments.

c. For a desired date and time, the dynamic data engine 310 may predict a range of prices or a price level profile for parking spaces for the specified parking system. These predictions may incorporate weather data and event data from third party sources. The range of prices may be presented to the operator for selection of the price level or price level profile for the next interval.

d. For cases where a user may make a reservation in advance, the selected price level or price level profile may be made for subsequent time intervals (e.g. for the next 12 months, or a time period established by the operator.).

e. A user may order a parking space for a selected date and time in a desired area.

f. The user application may offer dynamic pricing data 242 to the user. The dynamic pricing data 242 generated by the dynamic data engine 310 as selected by the operator from the price-utilization list for a plurality of parking systems in a desired area.

g. The user may select a parking space from the dynamic pricing data 242 to reserve a parking space.

In an aspect, dynamic data engine 310 may utilize artificial intelligence, statistical models, or other processes and/or algorithms. In embodiments, dynamic data engine 310 may utilize classifiers that map an attribute vector to a confidence that the attribute belongs to a class. For instance, dynamic data engine 310 may input attribute vector, $x=(x1, x2, x3, x4, xn)$ mapped to $f(x)=confidence(class)$. Such classification can employ a probabilistic and/or statistical based analysis (e.g., factoring into the analysis affinities and revenue or utilization attributes) to infer an action that a user desires to be automatically performed, adjustments to be made, or the like. In various embodiments, dynamic data engine 310 may utilize other directed and undirected model classification. Such approaches include, e.g., naïve Bayes, Bayesian networks, decision trees, neural networks, fuzzy logic models, and probabilistic classification models providing different patterns of independence. Classification may also include statistical regression that is utilized to develop models of priority. Further still, classification may also include data derived from another system, such as cameras, point of sales systems, GPS systems, or the like.

In accordance with various aspects of the subject disclosure, an example embodiment may employ classifiers that are explicitly trained (e.g., via a generic training data) as well as implicitly trained (e.g., via observing a user's behavior, user preferences, historical information, receiving extrinsic information). For example, support vector machines may be configured via a learning or training phase within a classifier constructor and feature selection module. Thus, the classifier(s) may be used to automatically learn and perform a number of functions, including but not limited to determining dynamic price adjustments, price adjustments based on environmental or external factors (e.g., weather, traffic, events, etc.), targeted advertising parameters, or the like. This learning may be on an individual basis, i.e., based solely on a single user, or may apply across a set of or the entirety of the user base. Information from the users may be aggregated and the classifier(s) may be used to automatically learn and perform a number of functions based on this aggregated information. The information may be dynamically distributed, such as through an automatic update, a notification, or any other method or means, to the entire user base, a subset thereof, or to an individual user.

In one embodiment, the targeted promotion engine 320 may identify, generate and send targeted promotions including offers, messages and/or notifications to the user device based on the input preferences set up by the merchants. The merchants may be located on or adjacent to premises of the parking system but this disclosure does not limit the location of the merchants as any merchant may be contemplated herein, for example, online retailers, or other remotely located businesses interested in offering promotions to targeted customers. In particular, a targeted promotion may be presented to the user via the user device 120 as the user enters the parking system, is approaching the parking system, or is in a defined area proximate to the parking system. FIGS. 19 and 20 illustrate a user application that has been provided targeted promotions from company 1, company 2, and company 3.

Because the user accesses the application program via the user device 120 to enter the parking system, the parking management system 100 may receive the time and date of entry. The user may receive targeted promotion notifications within a predetermined time after their entry into the parking garage. Alternatively, GPS functionality built into the user's smartphone or other proximity sensing technologies may be used to determine whether the user has entered into the parking system, is approaching, or adjacent to the parking system.

Once the user enters within the range of the merchants on premises, the user may further receive the targeted promotion data. This may be done by using the GPS functionality built into the user's smartphones, or other proximity sensing technology. The targeted promotion comprises an offer, messages, or notification sent to user devices 120 that are associated with the parking management system 100 to park a vehicle in a space of a parking system.

In one embodiment, the targeted promotion engine 320 may be programmable by the merchants with access to merchant consoles. The merchants may typically be located on the premises of the parking system or in proximity thereto. The targeted promotion engine 320 may analyze data from user devices and the central database 220 to generate targeted promotions 244. FIGS. 25-29 illustrate a dashboard for a merchant application that has been implemented to be accessed by the merchant at the merchant console. The targeted promotion 244 may be based on various user data including the time of the day, weather, location, date or other parameter such as a demographic of the user, flight information, booking information, and user preferences.

The parking management system 100 may be employed to use hardware and/or software to solve problems that are highly technical in nature, that are not abstract and that may not be performed as a set of mental acts by a human. For example, the parking management system 100 may be employed to use hardware and/or software to perform operations including affective computing related to automatically detecting and recognizing user information, correlating the user information with parking data (e.g. price) associated with a specific price sensitivity of the user, and automatically selecting and providing targeted promotion for the user. Further, some of the processes performed may be performed by the dynamic data engine 310 and targeted promotion engine 320 which are specialized computers for carrying out defined tasks. These tasks facilitate receiving and correlating user interaction information with a respective merchant to automatically determine merchants of the targeted promotion that may be considered effective. The parking management system 100 may further provide technical improvements to live and internet based learning systems, such as artificial intelligence, by improving processing efficiency among processing components associated with selecting and providing dynamic pricing data and targeted promotion data associated with an advertisement in real-time based on a user's current price sensitivity and preferences.

In various embodiments, the server 102 and the one or more user devices 120 may operate in a server/client relationship wherein a targeted promotion associated with an advertisement or marketing deal is provided to the one or more user devices 120. The targeted promotion may be generated from feedback information regarding the location, history, and preferences for a product offered by a merchant in proximity to a selected parking system. The feedback information may also be generated from a survey procured by the system prompting the user to respond to various questions regarding preference.

The one or more user devices 120 may receive the dynamic price data and the targeted promotion provided by the server 102. In some implementations, the one or more user devices 120 may also facilitate capturing feedback information regarding the respective users' need or desire for the targeted promotion and provide the feedback information to the server 102.

In at least one embodiment, the server 102 may initiate an exit survey or promotion process via the user devices 120. It is noted, however, that user devices 120 may initiate the exit survey or promotional process and may send results or other information to the server 102. As an example, a user may exit a parking garage and utilize a bar code, NFC, or the like at an exit point. The user device 120 may identify that the user is exiting and may generate a notification or alert. The notification may comprise audio, video, tactile, or other notifications. In an embodiment, the notification may comprise an exit survey that prompts the user for feedback regarding satisfaction, improvements, suggestions, ratings, or the like. The survey may prompt the user to provide information regarding airlines, an airport, the parking facility, retail stores, restaurants or other food vendors, or the like. It is noted that the system may provide an incentive to the user to complete the survey, such as promotional codes, discounts, or the like. In some examples, the notifications or surveys may be provided on behalf of third parties, such as airlines, airports, retailers, or restaurants.

Additionally or alternatively, the user devices 120 may receive or generate notifications regarding promotions or advertisements for establishments near the parking garage. For example, when leaving an airport, the user devices 120 may generate notifications regarding nearby gas stations, convenience stores, hotels, restaurants, attractions, or the like. It is noted that the system may utilize a physical proximity of an establishment to the parking garage to select the establishment for an advertisement or notification. For example, a list of advertisements may be generated by the user devices 120. Establishments may be presented in an order based on proximity the parking garage. In other examples, the user may define a distance (e.g., establishments within 10 miles) for which it desires to receive notifications. It is noted, however, that some embodiments may generate notifications or advertisements independent of distances.

Notifications or surveys may be generated at times other than entry/exit of a garage. For instance, the user device 120 may generate notifications when a user is not driving, is idle, or upon request by a user. In an example, the user may be on a return flight to an airport. When the user arrives at the airport, the user may utilize the user device 120 to look up a location where the user parked (e.g., floor, parking spot number, etc.). The user device 120 may generate notifications or surveys at this time as the user is not driving.

Embodiments of the present invention may be a system, a method, an apparatus and/or a computer program product at any possible technical detail level of integration. The computer program product may include a computer readable storage medium (or merchant) having computer readable program instructions thereon for causing a processor to carry out aspects of the present invention. The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium may also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission merchant (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages. The computer readable program instructions may execute entirely on the user's computer, partly on the user's computer, as a stand-alone software package, partly on the user's computer and partly on a remote computer or entirely on the remote computer or server.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

Figure 7:
FIGS. 7 and 8 illustrate a gate of a parking system in accordance with one aspect of the present disclosure.
Figure 8:
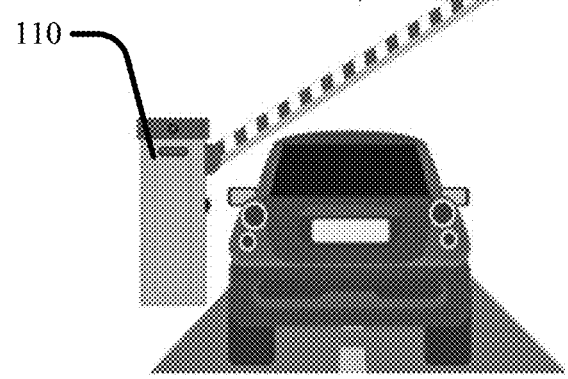
Figure 11:
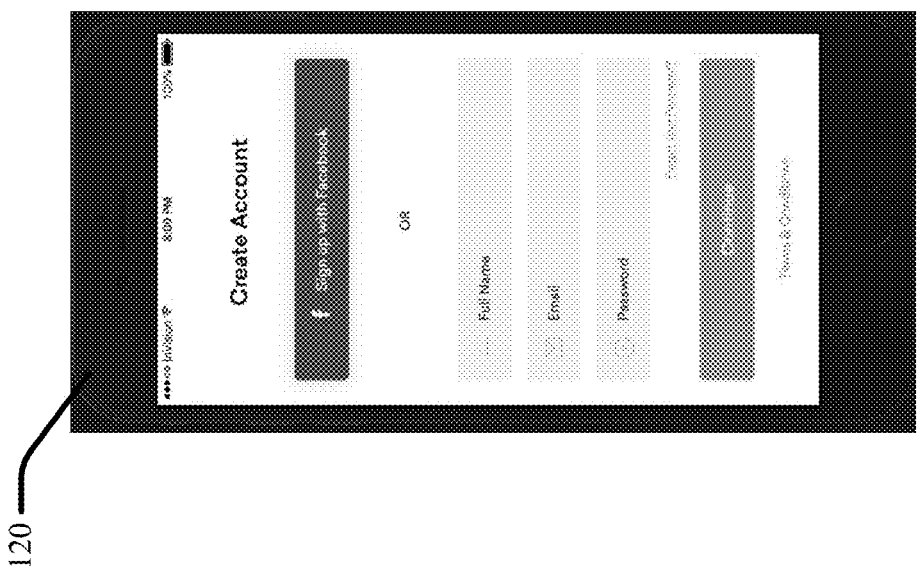
Figure 10:
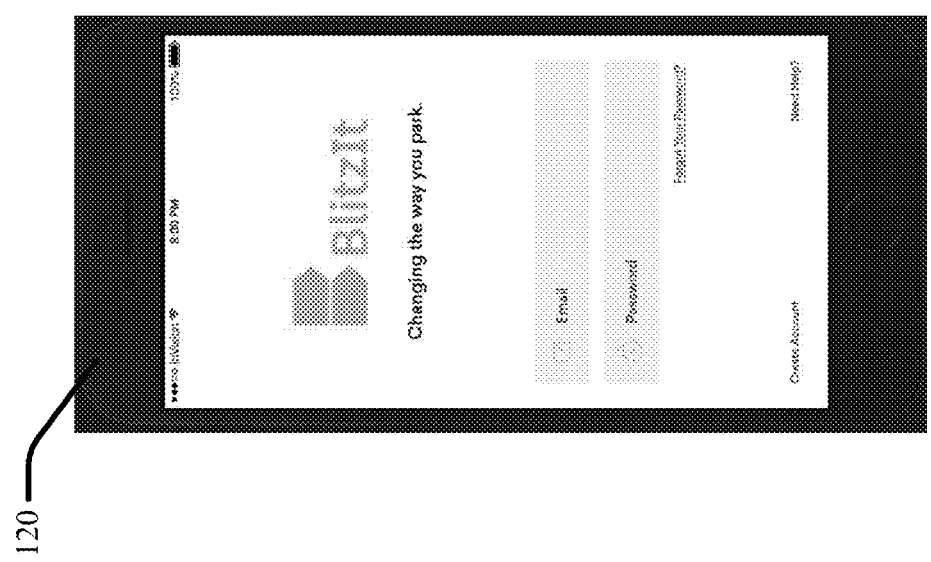
Figure 9:
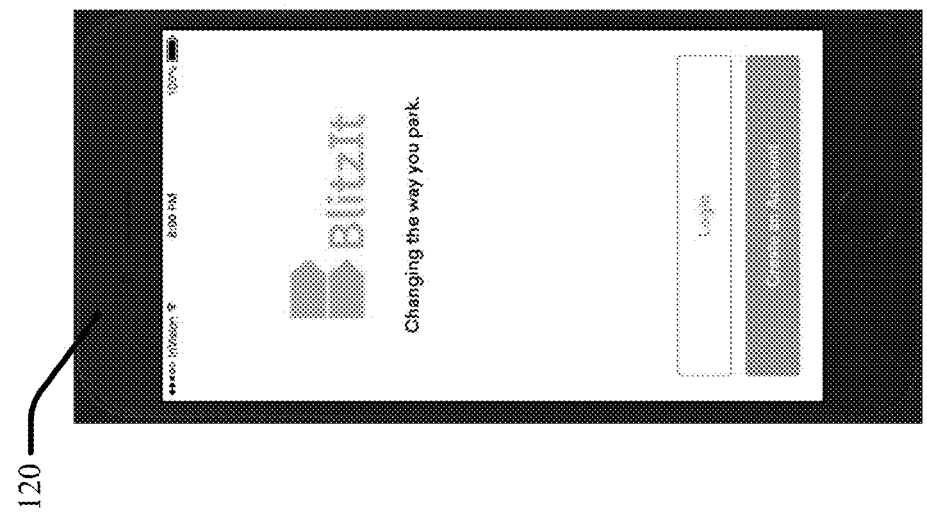
Figures 12, 13:
Figures 14, 15:
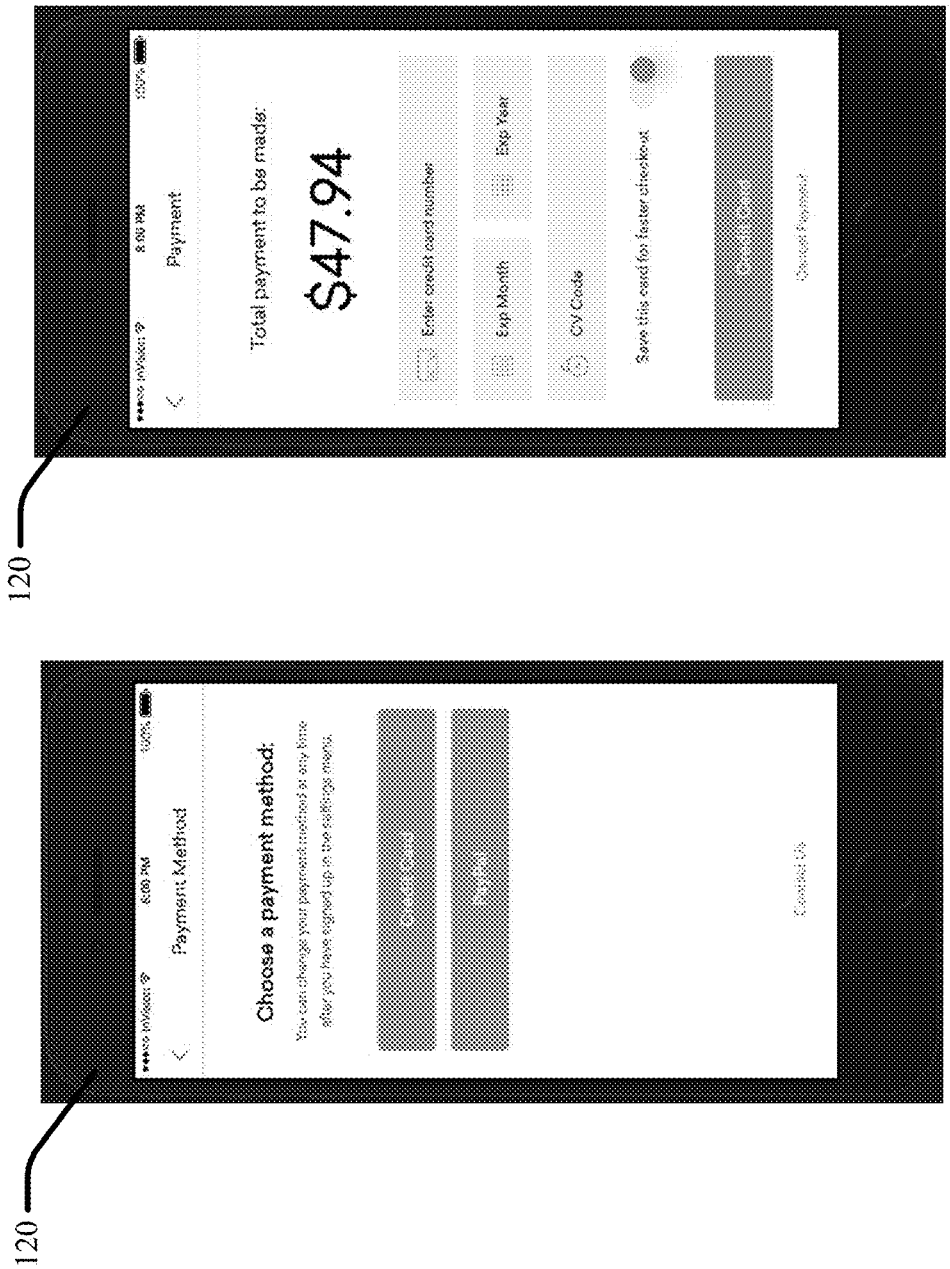
Figures 16, 17:
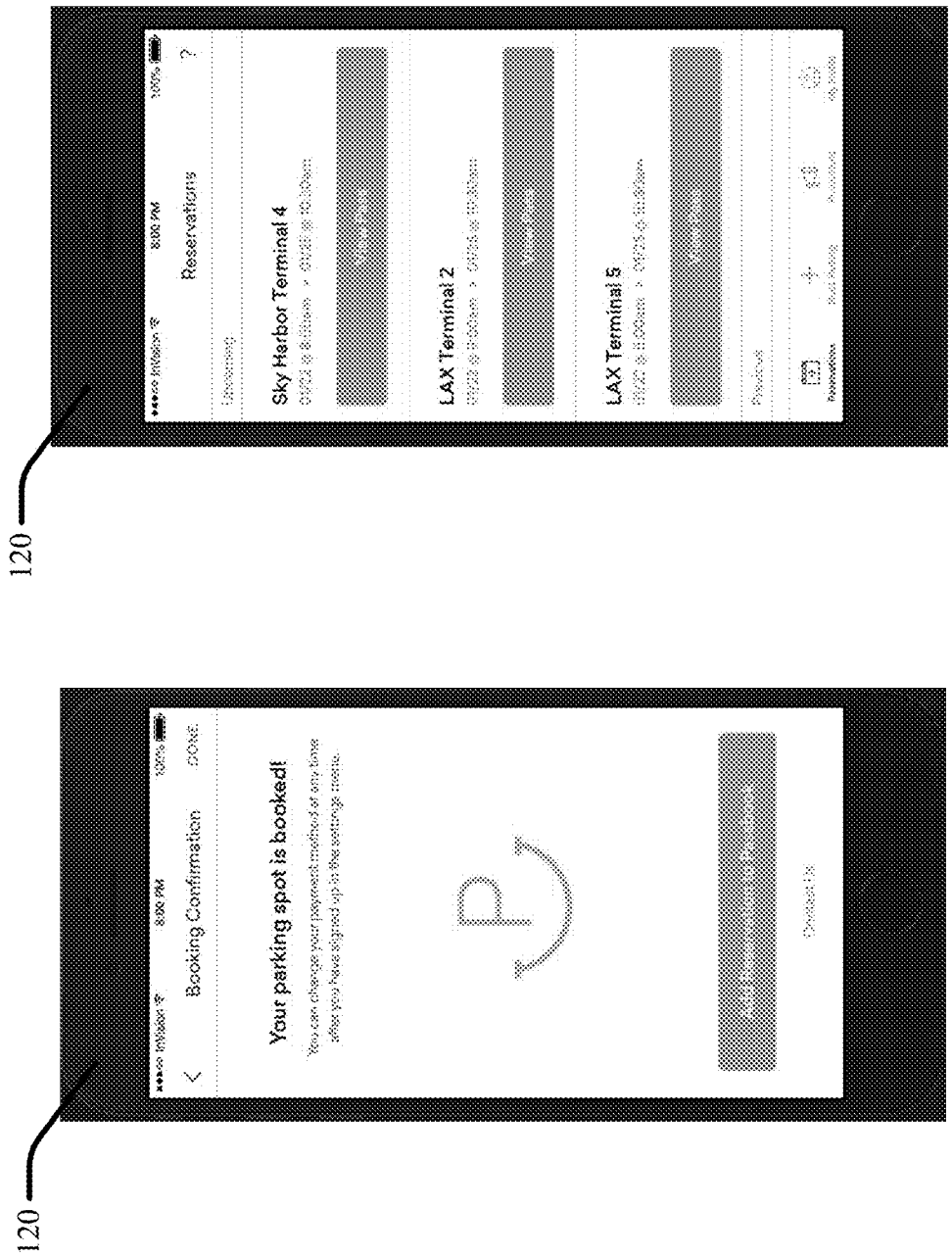
Figure 18:
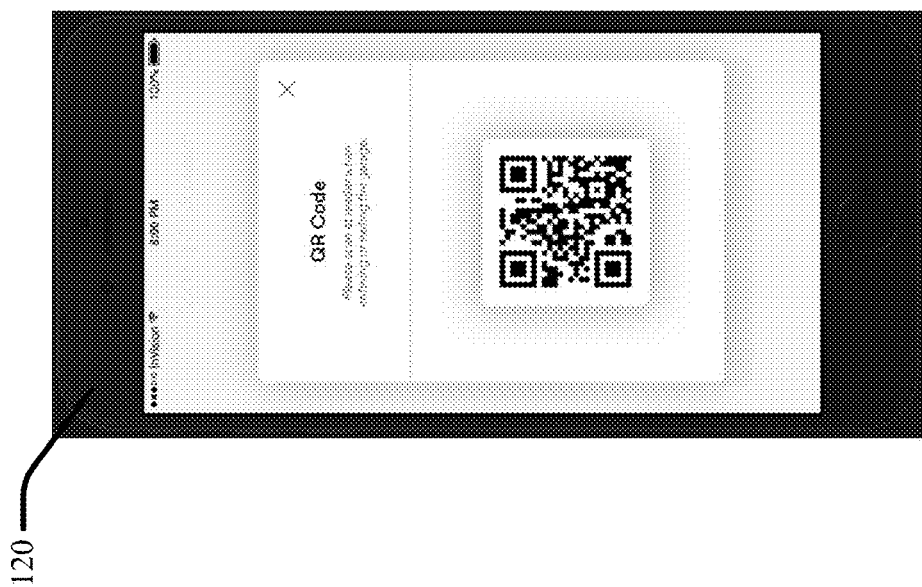
Figure 22:
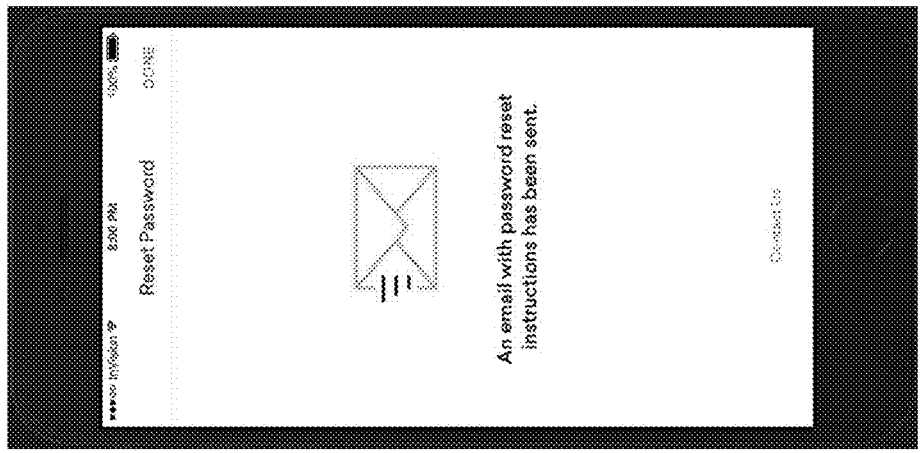
Figure 21:
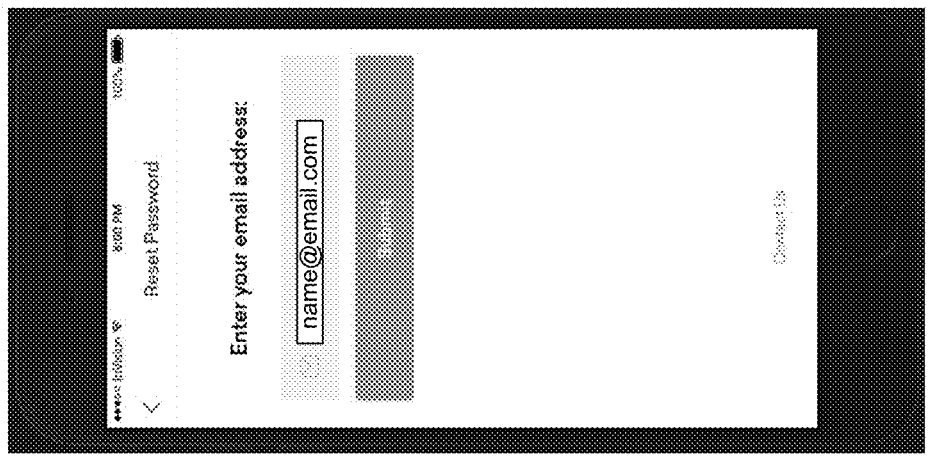
Figure 24:
Figure 23:
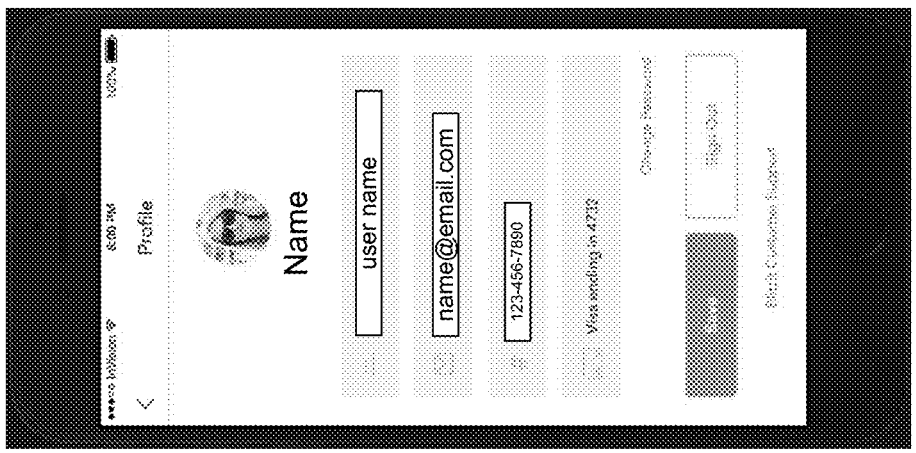
Figure 25:
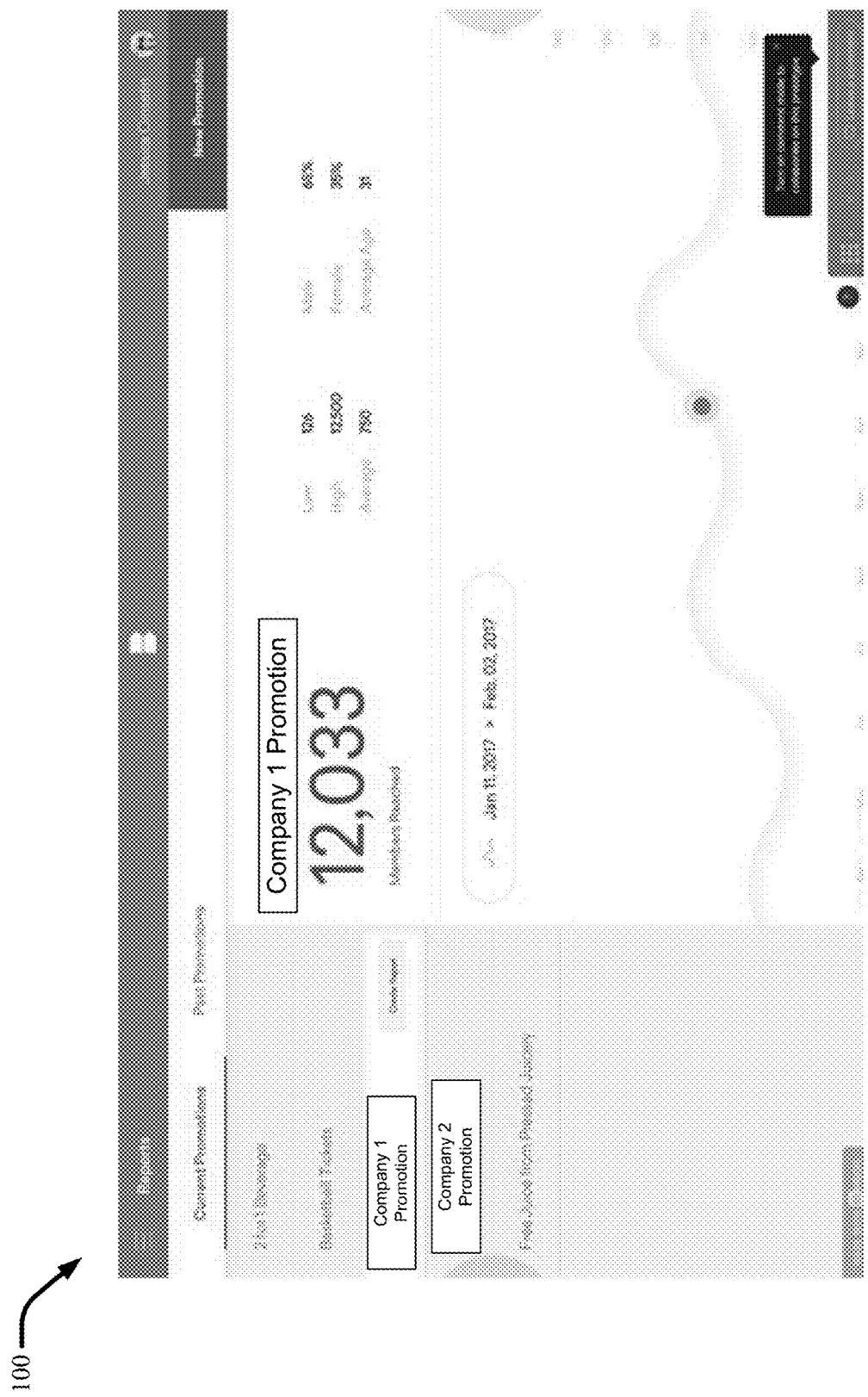
FIGS. 25-28 illustrate images displayed on a graphical user interface of a merchant dashboard of the present disclosure.
Figure 26:
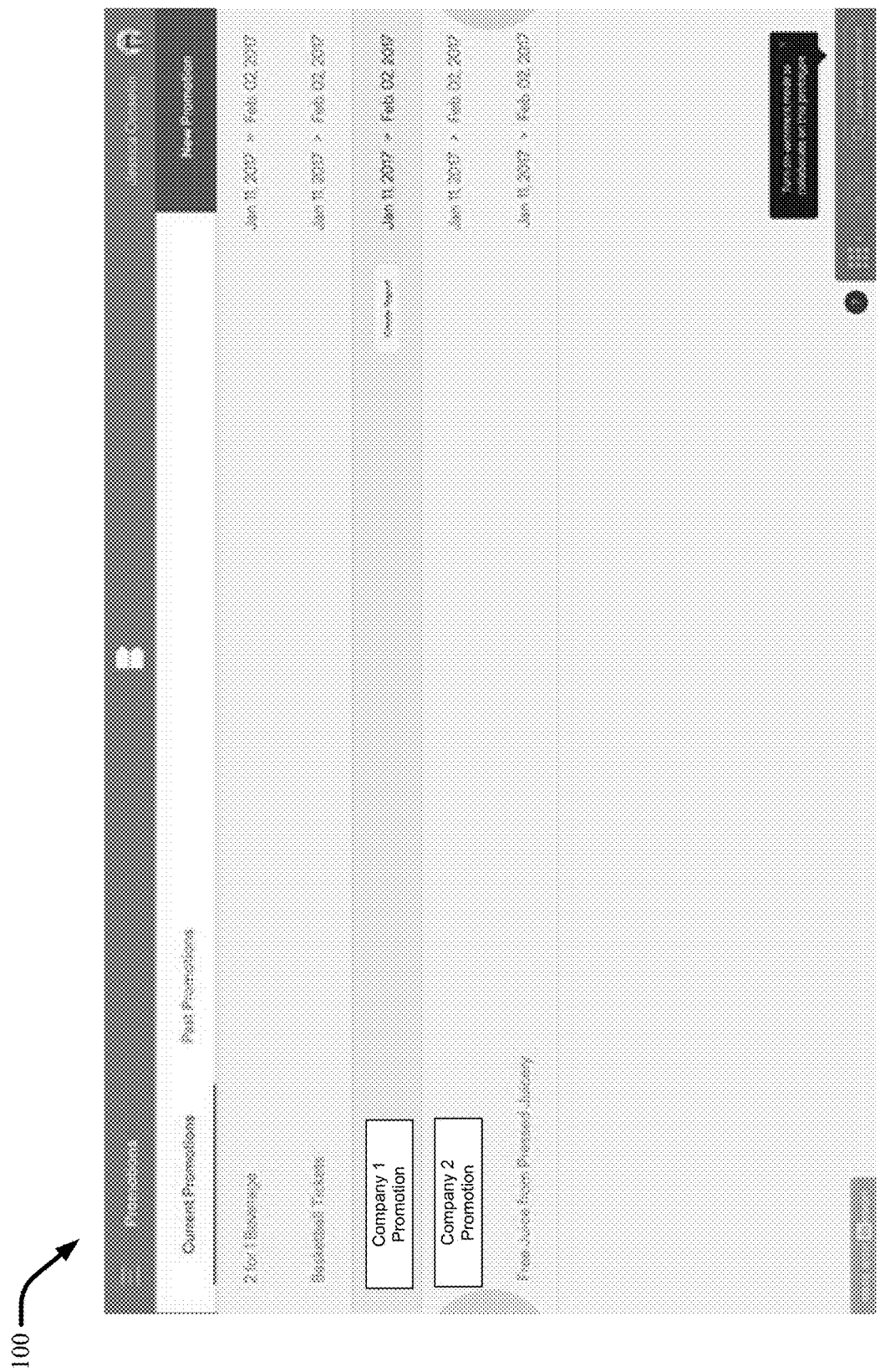
Figure 27:
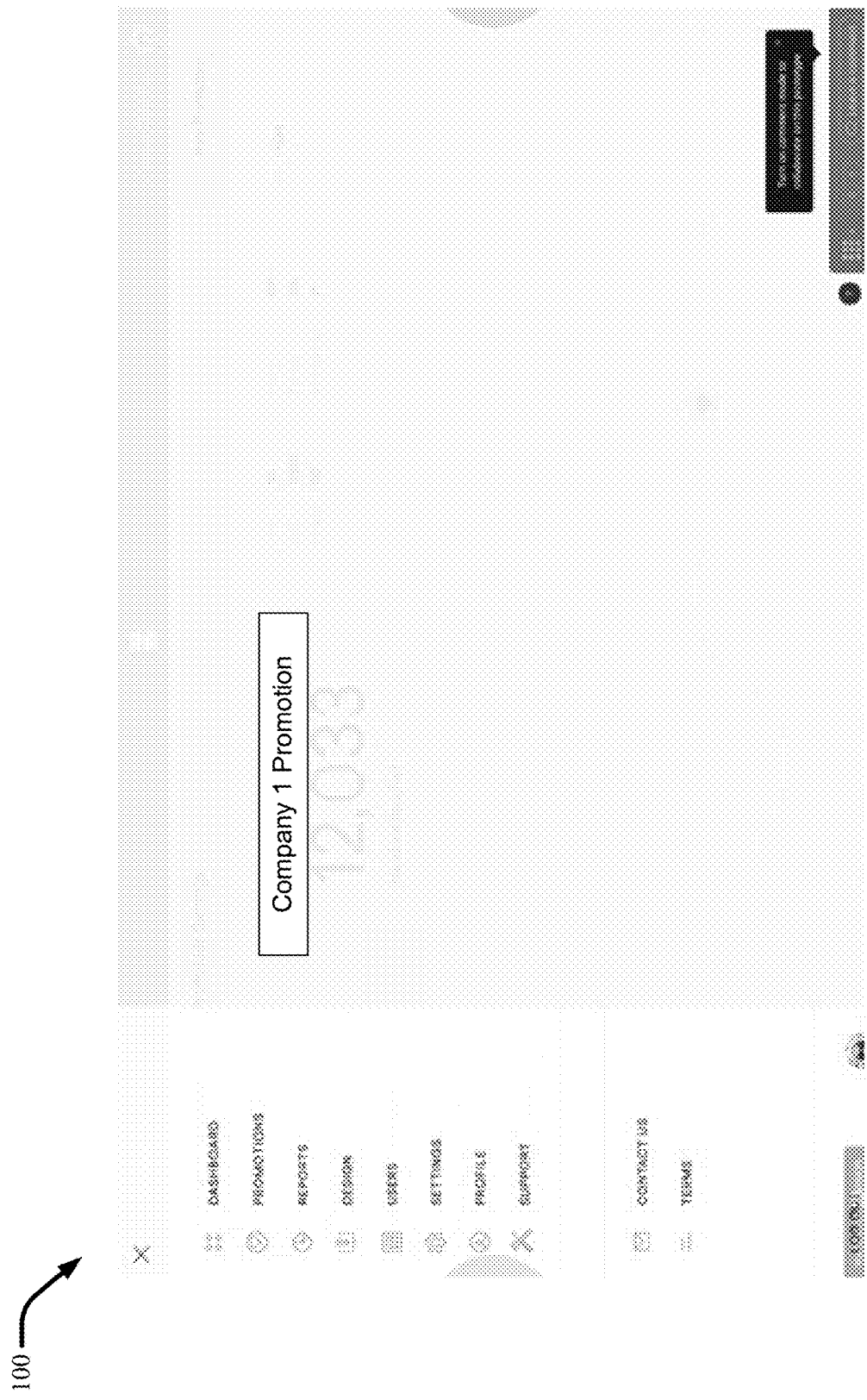
Figure 28:
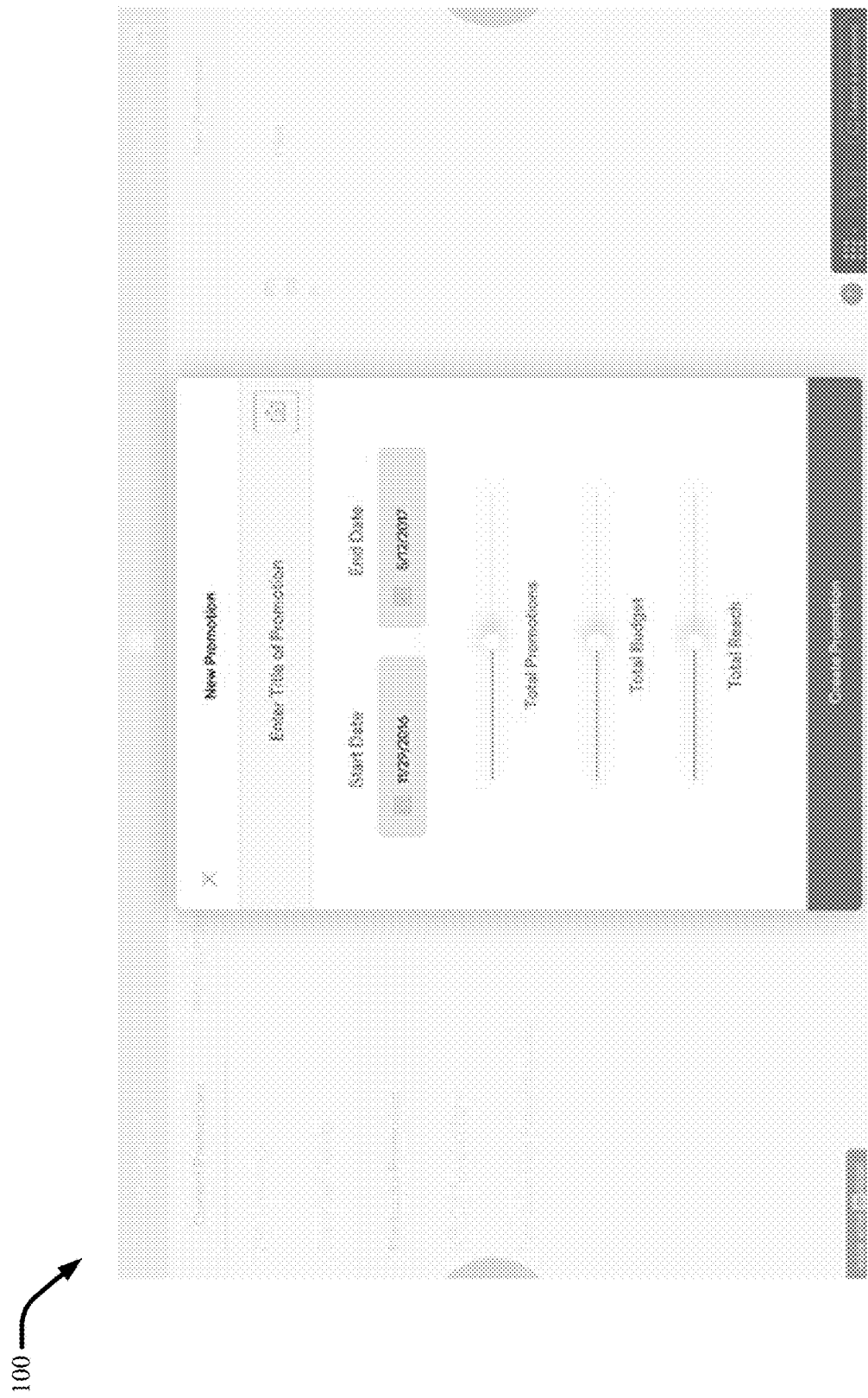

Referring to FIGS. 9-24, the parking management system 100 may include dashboard screen shots that are displayed on the user device 120 of the present disclosure. The app may be downloaded on the user device as illustrated by FIG. 9 and the user may sign into the user application as illustrated by FIGS. 10 and 11. FIG. 12 illustrates a desired area to park having displaying dynamic price data for three parking systems based on the date and time input by the user. FIG. 13 illustrates a booking confirmation dashboard. FIGS. 14-15 illustrate payment screens while FIGS. 16 and 17 illustrate confirmations and reservations respectively. FIG. 18 illustrates indicia, in the form of a quick response (QR) code, that may be presented to the parking gate control device 110 by the user to access the parking system. See also FIGS. 6-8. FIG. 19 illustrates targeted promotions from various companies that may be available to the user. FIG. 20 illustrates a selected promotion and indicia, in the form of a QR code, that may be presented to the merchant for purchase. The indicia may be a code or other scannable image such as a bar code (e.g., 2-dimensional, 3-dimensional, etc.), characters, or numbers and this disclosure is not limited. FIGS. 21-23 illustrate other screenshots regarding a user's account and password while FIG. 24 illustrates an application support screen.

With respect to FIGS. 25-28, the merchant dashboard is illustrated that may be accessible by the merchant to provide various inputs related to the duration and type of promotion that may be offered. The merchant application may display information received from the targeted promotion engine 320 and allow the merchant to review data and provide inputs thereto. The merchant may schedule a promotion for a specific duration of time as well as track existing and historical promotions or offer new promotions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

What is claimed is:

1. A parking management system comprising:
   a central database in operative communication with a user device, a merchant console, wherein the central database operatively stores historic pricing data and historic utilization data of a parking system associated with the merchant console, and wherein the central database comprises:
   a processor and a memory storing instructions that, when executed by the processors, cause the processors to execute computer executable engines stored in the memory, the engines comprising:
   a dynamic data engine configured to:
   analyze the historic pricing data and the historic utilization data from the parking system to generate a pric0e-utilization list for the parking system, the price-utilization list comprising multiple price profiles that associated utilization with pricing for a parking spot in the parking system;
   periodically update a selection of one of the multiple price profiles based on real time data and an optimization criterion received from the merchant console;
   generate a model to predict utilization of the parking system, the model being based on a the historic utilization data and at least one forecasted parameter;
   at a first time, in response to a request from the user device including a second time, generate a reservation for one of the parking spaces for the second time with a price dynamically determined by a predicated utilization at the second time by the model and the selected one of the price profiles, wherein generating the reservation includes generating a code to transmit to the user device, that when communicated to an on-site system, provides access to the one of the parking spaces; and
   a targeted promotion engine configured to:
   at the second time, monitor activity of the user device; and
   when the activity is indicative of a vehicle not being driven, generate a targeted promotion based on the user data, wherein the targeted promotion is to be sent to the user device, and wherein the target promotion relates to a retailer associated with a physical location located within a defined geological fence of a the reserved parking space, wherein the activity indicative of the vehicle not being driven includes a predetermined timer period after the code is used to gain access to the one of the parking spaces.

2. The parking management system of claim 1, wherein the at least one forecasted parameter comprises at least one of a current utilization, weather, and foot traffic.

3. The parking management system of claim 1, wherein the model is also based on an input of date and time.

4. The parking management system of claim 1, wherein the price profile includes a price increase granularity and wherein the model generates the price to occupy the parking spaces in the parking system as a function of the price increase granularity.

5. The parking management system of claim 1, wherein the historical utilization data stored in the central database includes utilization data associated with at least one of usage time, parking price, utilization rate, weather information, competitive pricing, and foot traffic.

6. The parking management system of claim 1, wherein the targeted promotions includes offers, messages, or notifications based on an input preferences set up by the merchants.

7. The parking management system of claim 1, wherein said targeted promotion engine generates and sends the target promotions based on information associated with the user device.

8. The parking management system of claim 1, wherein the targeting promotion engine captures feedback data from one or more user devices and determines a user affinity for the targeted promotion and provide the feedback information to the database.

* * * * *